US007840795B2

(12) United States Patent
Peterson et al.

(10) Patent No.: US 7,840,795 B2
(45) Date of Patent: Nov. 23, 2010

(54) METHOD AND APPARATUS FOR LIMITING ACCESS TO SENSITIVE DATA

(76) Inventors: Zachary Nathaniel Joseph Peterson, 141 S. Curley St., Baltimore, MD (US) 21224; Adam Bradley Stubblefield, 762 Tyner Way, Incline Village, NV (US) 89451; Stephen C. Bono, 1020 Park Ave., Apt. 207, Baltimore, MD (US) 21201; Matthew Daniel Green, 1017 W. 38$^{th}$ St., Baltimore, MD (US) 21211

( * ) Notice: Subject to any disclaimer, the term of this patent is extended or adjusted under 35 U.S.C. 154(b) by 776 days.

(21) Appl. No.: 11/809,898

(22) Filed: May 31, 2007

(65) Prior Publication Data
US 2008/0091934 A1 Apr. 17, 2008

Related U.S. Application Data

(60) Provisional application No. 60/829,682, filed on Oct. 17, 2006.

(51) Int. Cl.
*G06F 15/177* (2006.01)
(52) U.S. Cl. ............................ 713/2; 713/1; 713/100
(58) Field of Classification Search .................. 713/1, 713/2, 100
See application file for complete search history.

(56) References Cited

U.S. PATENT DOCUMENTS

| 5,692,124 | A | * | 11/1997 | Holden et al. | 726/2 |
| 5,859,966 | A | * | 1/1999 | Hayman et al. | 726/23 |
| 6,073,237 | A | | 6/2000 | Ellison | |
| 6,272,086 | B1 | | 8/2001 | Jaquette et al. | |
| 6,317,836 | B1 | * | 11/2001 | Goren et al. | 726/36 |
| 6,965,968 | B1 | * | 11/2005 | Touboul | 711/118 |
| 7,069,442 | B2 | * | 6/2006 | Sutton et al. | 713/179 |
| 7,076,655 | B2 | * | 7/2006 | Griffin et al. | 713/164 |
| 7,167,987 | B2 | * | 1/2007 | Angelo | 713/186 |
| 7,424,709 | B2 | * | 9/2008 | Neiger et al. | 718/1 |
| 7,506,170 | B2 | * | 3/2009 | Finnegan | 713/182 |
| 7,591,003 | B2 | * | 9/2009 | Focke et al. | 726/1 |
| 7,631,196 | B2 | * | 12/2009 | Kozuch et al. | 713/193 |
| 2005/0138423 | A1 | * | 6/2005 | Ranganathan | 713/201 |
| 2006/0123056 | A1 | * | 6/2006 | Darbha et al. | 707/104.1 |

OTHER PUBLICATIONS

Suh, G., et al., "The AEGIS Processor Architecture for Tamper-Evident and Tamper-Resistant Processing", Technical Report LCS-TM-461, Massachusetts Institute of Technology, Feb. 2003, pp. 1-19.
Tucek, J., et al., "Trade-offs in Protecting Storage: A Meta-Data Comparison of Cryptographic, Backup/Versioning, Immutable/Tamper-Proof, and Redundant Storage Solutions", Conference on Mass Storage Systems and Technologies, 2005, pp. 101-112.

(Continued)

*Primary Examiner*—Nitin C Patel

(57) ABSTRACT

Disclosed is a method and apparatus for sharing sensitive data. A trusted operating system is configured to securely execute boot instructions for one or more hardware component. A virtual operating system in communication with the trusted operating system is configured with one or more security policies defining access rights associated with the one or more hardware component.

19 Claims, 3 Drawing Sheets

OTHER PUBLICATIONS

Aiello, W., et al., "Using Smartcards to Secure a Personalized Gambling Device", Proceedings of the 6th ACM Conference on Computer and Communications Security, 1999, pp. 128-137.

Marsh, D., "Output Content Protection and Windows Vista", 2005, http://download.microsoft.com/download/5/D/6/5D6EAF2B-7DDF-476B-93DC-7CF0072878E6/output_protect.doc, Downloaded on May 25, 2007, pp. 1-45.

Marsh, D., "Longhorn Output Content Protection", http://www.download.microsoft.com/download/9/8/f/98f3fe47-dfc3-4e74-92a3-088782200fe7/TWEN05006_WinHEC05.ppt, Downloaded on May 25, 2007, 44 pgs.

Gutmann, P., "A Cost Analysis of Windows Vista Content Protection", http://www.cs.auckland.ac.nz/~pgut001/pubs/vista_cost.html, Downloaded on May 25, 2007, pp. 1-44.

VMWare Corp., "VMWare ACE Administrator's Manuel", http://www.vmware.com/pdf/vmware_ace2_manual.pdf, Downloaded on May 25, 2007, pp. 1-282.

"OmniAccess 3500 Nonstop Laptop Guardian", http://www1.alcatel-lucent.com/enterprise/en/products/enterprise-security/omniaccess3500/?_requestid=279054, Downloaded on May 25, 2007, 1 page.

"GRUB TCG Patch to Support Trusted Boot", http://trousers.sourceforge.net/grub.html, Downloaded on May 25, 2007, pp. 1-6.

"Embassy Trust Suite", http://www.wavesys.com/products/ets.html, Downloaded on May 25, 2007, pp. 1-2.

"BitLocker Drive Encryption", http://technet.microsoft.com/en-us/windowsvista/aa905065.aspx, Downloaded on May 25, 2007, 1 page.

"Seagate Technology—Seagate Delivers Industry's Strongest Security for ASI Laptop Computers", http://www.seagate.com/ww/v/index.jsp?locale=en-US&name=ASI_Laptop Release—Sally&vgnextoid=9eb309beea731110VgnVCM100000f5ee0a0aRCRD, Downloaded on May 25, 2007, 1 page.

"Microsoft Biometric ID Technology", http://www.microsoft.com/products/msbit/default.mspx, Downloaded on May 25, 2007, 1 page.

"Utimaco", http://www.utimaco.com/C12570CF0030C00A/CurrentBaseLink/W26K9K3U965OBELEN, Downloaded on May 25, 2007, pp. 1-3.

An Introduction to Virtualization, http://www.kernelthread.com/publications/virtualization/, Amit Singh, Written in Jan. 2004 (unconfirmed), publication date unknown.

* cited by examiner

METHOD AND APPARATUS FOR LIMITING ACCESS TO SENSITIVE DATA

This application claims the benefit of U.S. Provisional Application No. 60/829,682 filed Oct. 17, 2006, which is incorporated herein by reference.

BACKGROUND OF THE INVENTION

The present invention relates generally to data security and more specifically to limiting access to sensitive data.

Security of stored electronic data has become an important issue. The unauthorized access of sensitive (e.g., proprietary or confidential) data can often result in a reduction or loss in value of the data.

Ensuring data security is complicated when the owner of the data is forced to share its data with an untrusted party. Providing an untrusted party access to sensitive data, even for a very brief period of time, is a significant risk.

This problem can arise in a variety of situations. For example, in a litigation or negotiation, an owner of data may need to disclose sensitive data to an untrusted party. This may be the result of the requirements of the negotiation, or may result from a court order during a litigation. The data owner is reticent to release its data to the untrusted party, fearing unauthorized disclosure or use of the sensitive data. This may be especially problematic when the data owner and the untrusted party are business competitors.

This presents a sensitive data sharing dilemma. Specifically, the untrusted party requires adequate access to the data. The data owner, on the other hand, wants to prevent unauthorized use or disclosure of the data. One existing solution is to provide only hard copy versions of the data to the untrusted party. The hard copy versions may be locked up (e.g., in a safe) for security when not being accessed. Further, only providing hard copies of the data makes duplication or transfer of the data more difficult, as compared to electronic copies of the data.

For large electronic data sources, such as source code repositories or databases, however, hard copies are often unmanageable. Electronic data is typically easier to review and manipulate. Electronic data, however, is also often easier to misuse, as it often can be copied and/or shared easily. As a result, there is a tradeoff between the ease of review of electronic data with the ease of misuse of electronic data.

There is a need to alleviate many of the concerns associated with sharing sensitive data electronically.

BRIEF SUMMARY OF THE INVENTION

To share sensitive data more securely, a system having trusted hardware and software components can be used. An operating system, in conjunction with trusted hardware, may be verified to reduce the likelihood that tampering has occurred. To limit the functionality of the one or more hardware components, access rights associated with the one or more hardware components may be enforced.

In more detail and in accordance with an embodiment of the invention, a trusted operating system is configured to securely execute boot instructions for one or more hardware components. The trusted operating system is configured to enforce one or more security policies defining access rights associated with the one or more hardware components of a virtual operating system. This configuration enables the secure sharing of sensitive data.

The hardware components may include, for example, an input/output (I/O) module, a storage module, a networking module (e.g., a router or an interface), and/or an authentication device (e.g., a smart card reader and/or a biometric authentication component such as a fingerprint scanner).

In another embodiment of the invention, an operating system is configured to execute boot instructions for one or more hardware components. One or more output devices are configured to deliver information. A virtual operating system is in communication with the operating system and configured with one or more security policies defining an information rate of the one or more output devices. The information rate is the amount and/or quality of data that can be transmitted to the one or more output devices.

The operating system may be a trusted operating system configured to securely execute the boot instructions for the hardware component(s). Additionally, examples of the output device include a monitor, a printer, an audio device, and/or a networking module (e.g., a router or a network interface). Further, the one or more security policies may be changed by a remote server.

These and other advantages of the invention will be apparent to those of ordinary skill in the art by reference to the following detailed description and the accompanying drawings.

DETAILED DESCRIPTION

Figure 1:
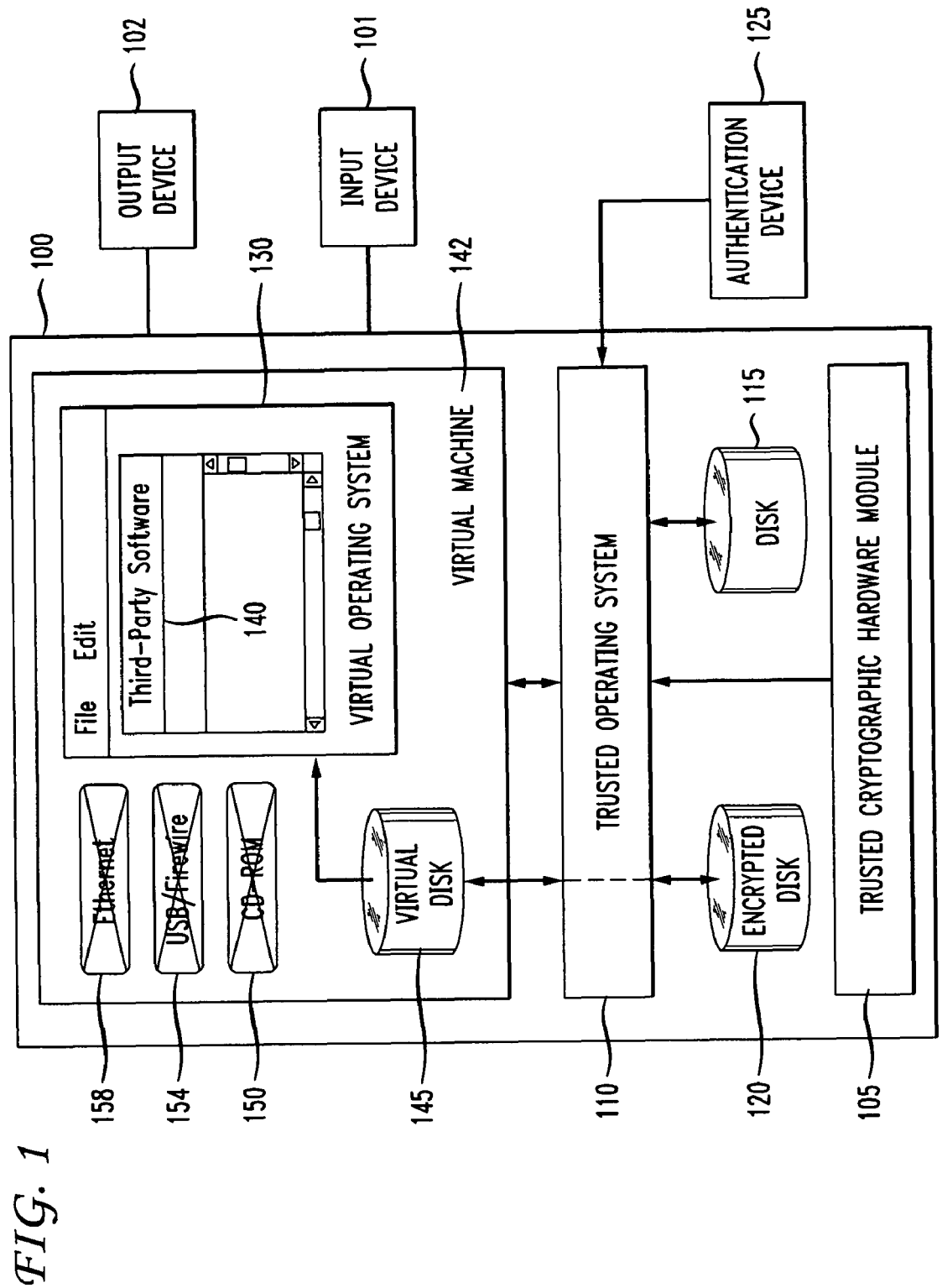
FIG. 1 is a block diagram of a security system in accordance with an embodiment of the present invention.

FIG. 1 is a block diagram of a security system 100 that enables the secure delivery, management, and reclamation of sensitive data. The system 100 is an autonomous computer system that enforces one or more security policies to limit (e.g., control or prevent) access to the data stored on the system 100.

In one embodiment, the security system 100 limits use of one or more of its input-output (I/O) devices to control access to the data stored on the system 100. I/O can be limited to, for example, input device 101 and/or output device 102. Input device 101 can include, but is not limited to, a keyboard and/or a mouse. Output device 102 can include, but is not limited to, a monitor, a printer, another computer, an audio device, or any subset of these or other devices.

The security system 100 includes a Trusted Cryptographic Hardware Module (TCHM) 105. The TCHM 105 is one or more secure micro-controllers that operate within predetermined guidelines. The predetermined guidelines are parameters that control how the TCHM 105 operates. The TCHM 105 provides cryptographic services, such as the secure generation of cryptographic keys, limiting the use of those keys, random number generation, software attestation, encryption and authentication. The TCHM 105 can store keys, passwords, and/or digital certificates that may be used to provide a secure system. The TCHM 105 may include various tamper-resistant/evident features. In one embodiment, the TCHM 105 is a Trusted Platform Module (TPM).

The TCHM 105 is associated with a particular system 100. The TCHM 105 is capable of authenticating the software on the security system 100. The TCHM 105 can be used to verify that a request to access hardware in the system 100 originates from software on the system 100 instead of software executing on another system such as another computer.

The security system 100 also includes a trusted operating system 110. The trusted operating system 110 executes computer program instructions such as boot instructions for one or more hardware components. In one embodiment, the trusted operating system 110 securely executes boot instructions for the hardware components of the system 100. The trusted operating system 110 is trusted because the operating system 110 is verified with keys derived from the TCHM 105. If the operating system 110 is modified, the TCHM 105 will not generate the correct keys and therefore will not authenticate the operating system.

The trusted operating system 110 may further prevent software from being installed on the security system 100. In one embodiment, the TCHM 105 enables the system 100 to perform a verified boot sequence. A verified boot sequence is a boot sequence that halts when the sequence of boot instructions is invalid (e.g., has been modified, accidentally or maliciously). Untrusted software loaded onto the device will cause a verification failure and a subsequent halting of the system. As a result, untrusted software cannot be installed. Thus, the security system 100 may be restricted to executing only a predetermined set of software applications, and the trusted operating system 110 ensures a fixed working environment.

The trusted operating system 110 is in communication with one or more disks. For example, the trusted operating system 110 is in communication with a disk 115 and an encrypted disk 120. These disks do not necessarily have to be physically separate disks. The disks can be implemented as partitions on a single disk. Due to the encryption and authentication of the encrypted disk 115, data acquisition and data manipulation may be limited or prevented.

The trusted operating system 110 may authenticate users to ensure that only intended users are using the system 100. In one embodiment, the security system 100 can authenticate users by using its hardware (which, for instance, has cryptographic capabilities and/or has limited I/O capabilities). In addition to protecting the sensitivity of the data, the hardware can also prevent the recovery of the data if the device is tampered with or stolen. In one embodiment, a TCHM key (i.e., a trusted cryptographic hardware (TCH) derived or stored key) is used to encrypt one or more disks. By encrypting the disk(s) with a TCH key, a stolen hard disk typically cannot be used by a malicious party to obtain the sensitive data stored on the system 100 because the encryption key used to encrypt the data can only be derived from a single TCHM device. Without the TCHM device that originally generated the encryption key, it is extremely difficult to re-generate the TCH key. However, an administrator may migrate keys to another device for disaster recovery, etc.

The trusted operating system 110 may also support multi-factor authentication, such as biometrics (using a biometric authentication component such as a fingerprint scanner) and/or removable tokens such as smart cards (e.g., authentication device 125). For example, a user may have to provide a thumbprint onto a thumbprint scanner before authentication device 125 activates. In another embodiment, tokens acquired outside of the system 100 may be used to authenticate users. These tokens can allow user access to be remotely revoked to prevent further access to the system 100.

In one embodiment, the trusted operating system 110 enables an encrypted filesystem (EFS). Encryption keys used by the EFS may be derived from the TCHM 105. Once a verified kernel associated with the trusted operating system is loaded, the kernel can use the TCHM 105 to generate keys to be used with the EFS for the reading and writing of data. In one embodiment, these keys are managed in protected kernel memory. Thus, the keys are not accessible outside of kernel space nor ever written to disk. The keys are used by the EFS so long as the system's memory (e.g., Random Access Memory (RAM)) has power. When the system is powered down, the keys are cleared from memory. They do not reside persistently anywhere in the system.

The security system 100 may additionally employ a trusted clock. The clock is trusted because the clock cannot be tampered with or reset. The clock can be used to authorize access by a user for only a predetermined amount of time (e.g., 8 hours). After the predetermined amount of time (e.g., 8 hours) elapses, the security system can refuse to allow access by the user. In one embodiment, this clock is implemented in a smart card. Alternatively, a software clock measures "user time" (i.e., the time that the user has accessed data on the security system). Access may also be limited by restricting the number of executions performed by a user (e.g., the number of open or read operations performed by the user). Similarly, the number of pages printed by a printer connected to the security system may be restricted.

In one embodiment, the trusted operating system 110 installs and verifies a virtual operating system 130. As described in more detail below, the virtual operating system 130 is a computing environment in which user interactions such as I/O, network communications, etc. can be controlled via one or more security policies. A user accesses the sensitive data through the virtual operating system 130, thereby preventing unauthorized data transfer. The virtual operating system 130 may enable the installation of and execution of third-party software 140.

The virtual operating system 130 executes on a virtual machine 142 that communicates with the trusted operating system 110. The virtual machine 142 may host a virtual disk 145 that communicates with the trusted operating system 110 and the encrypted disk 120. Thus, the virtual disk 145 may have the same security features (e.g., encryption) as the encrypted disk 120.

In one embodiment, one or more of the security policies can be changed via a remote computer in communication with the security system 100. For example, a computer can communicate over a network with the security system 100 to adjust security policies stored on the security system 100. This may be beneficial when security policies need to be changed as a function of time or as a result of an occurrence such as a decision in one stage of a negotiation or litigation. Further, the security system 100 may require a username and password to be entered before the security policies can be changed remotely.

Security system 100 may contain one or more processors which control the overall operation of the security system 100 by executing computer program instructions which define such operation.

One skilled in the art will recognize that an implementation of security system 100 would contain other components as well, and that FIG. 1 is a high level representation of the components of the security system 100. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software.

Figure 2:
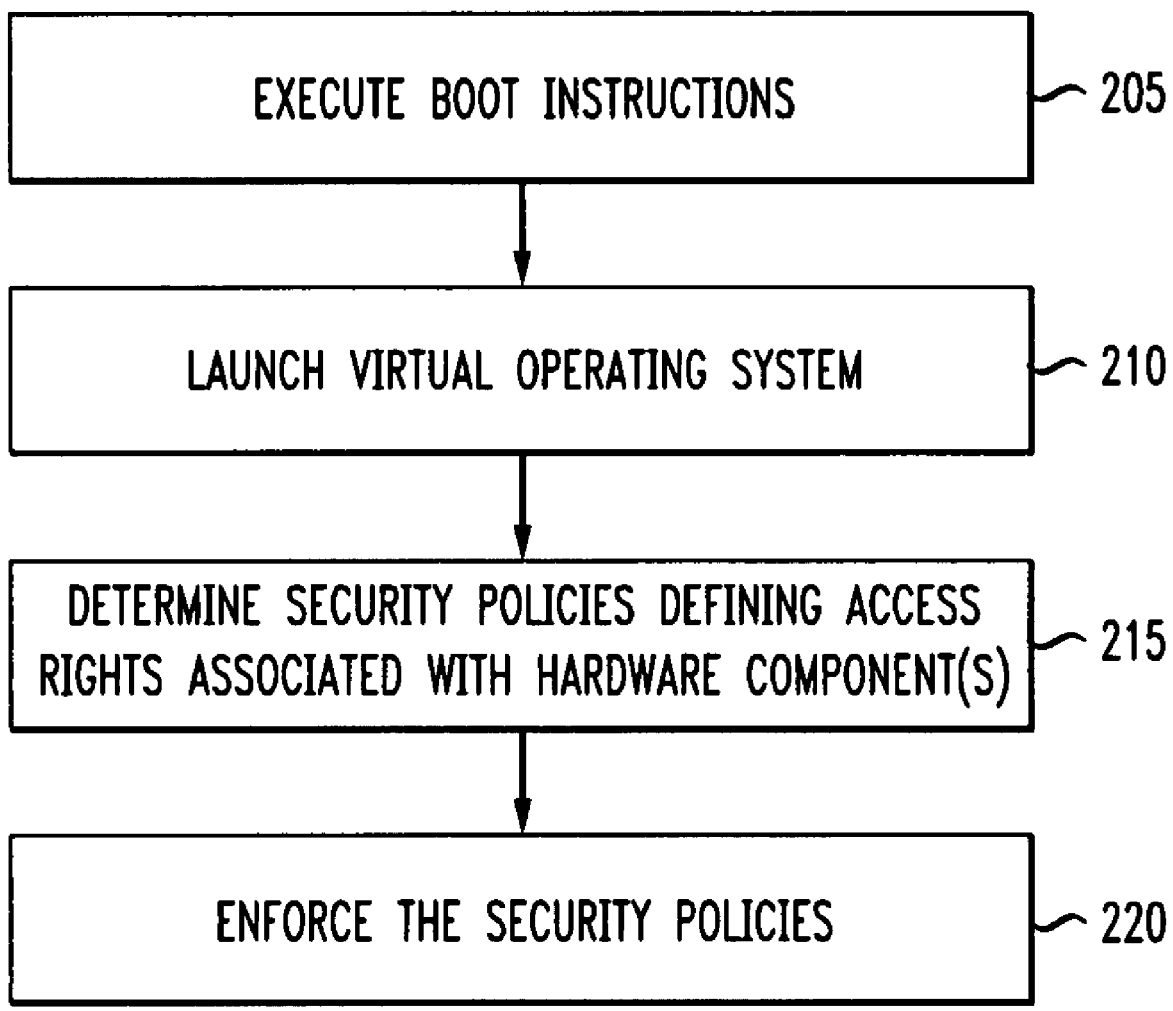
FIG. 2 is a flowchart showing the steps performed by a security system in accordance with an embodiment of the present invention.

FIG. 2 is a flowchart showing the steps performed by security system 100 in accordance with an embodiment of the present invention. TCHM 105 validates a trusted boot loader. The trusted boot loader then launches the trusted operating system 110. The trusted operating system 110 then executes one or more boot instructions for one or more hardware components, such as encrypted disk 120 and/or one or more I/O ports (e.g., a CD-ROM drive 150, a USB/Firewire port 154, and an Ethernet port 158) in step 205.

The trusted operating system 110 then launches a virtual operating system 130 in step 210. In one embodiment, the virtual operating system 130 configures virtual disk 145 enabling access to some or all of the data stored on the encrypted disk 120.

In step 215, the trusted operating system 110 defines access rights for the virtual operating system 130. For example, the one or more security policies may define access rights associated with the security system's I/O ports (e.g., CD-ROM drive 150, DVD drive, USB port/Firewire port(s) 154, etc.) or networking ports (e.g., Ethernet port 158, Wi-Fi, etc.). The access rights define the functions that the one or more hardware components can perform in the virtual operating system 130. There may be no, one or multiple access rights for each hardware component.

The trusted operating system 110 then enforces the one or more security policies in step 220. For example, if a security policy (i.e., access rights) states that the security system 100 cannot use its USB port 154 for any I/O, the USB port 154 is disabled in the virtual operating system 130. If a user plugs a flash memory drive into one of the security system's USB ports 154 in order to copy some or all of the sensitive data stored on the security system 100, the security system 100 does not recognize the flash memory drive in the virtual operating system 130 because the USB ports 154 are not useable by a user. In another embodiment, the security policy (i.e., access rights) may indicate that the USB port 154 can only connect to a printer and cannot connect to a flash memory drive. This access right prevents a user from copying data to the flash memory drive and instead limits the user to printing. FIG. 1 shows an example where the Ethernet 158, USB/Firewire port 154, and CD-ROM drive 150 are disabled by the trusted operating system 110 in the virtual operating system 130 and not useable by a user.

Figure 3:
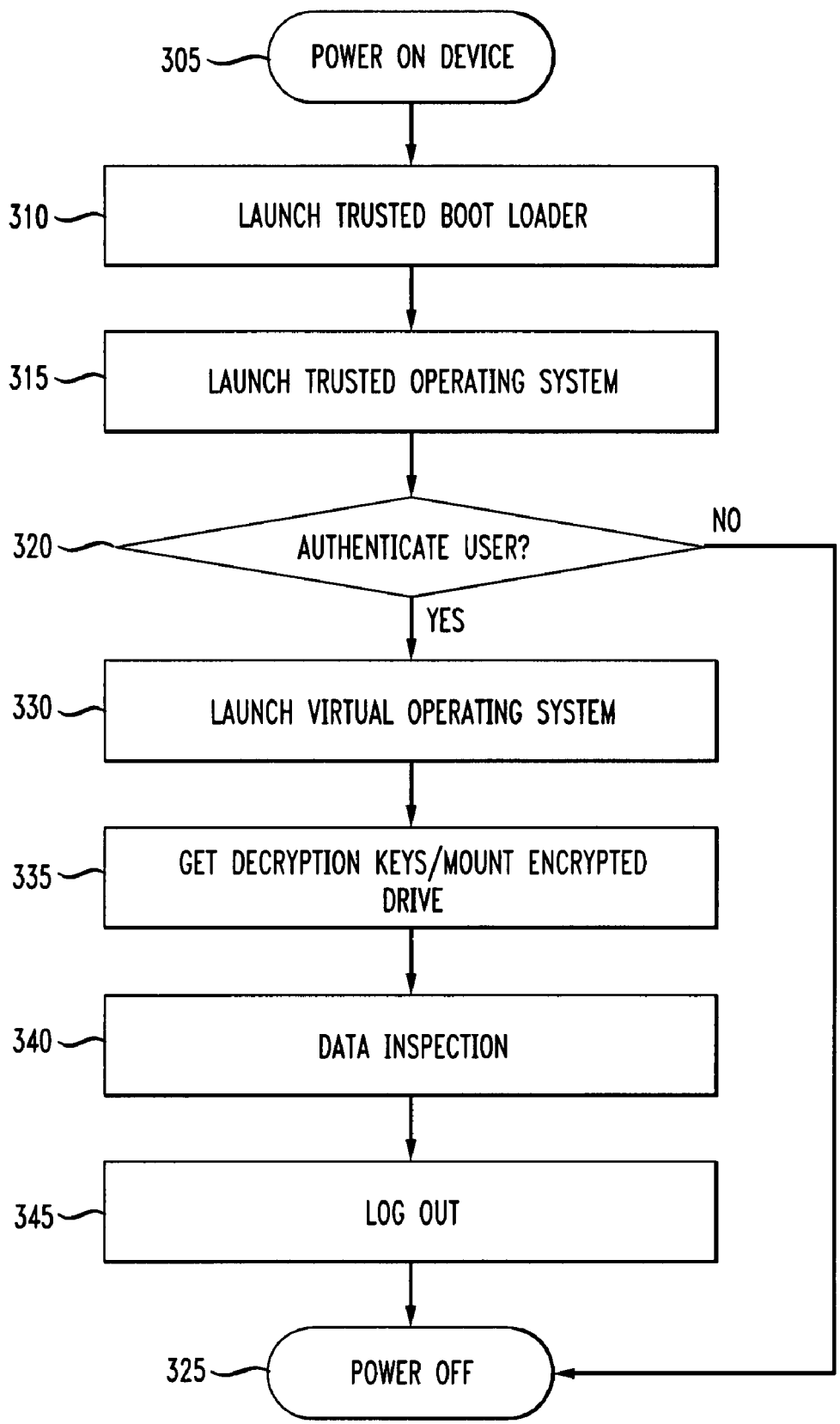
FIG. 3 is a more detailed flowchart illustrating the steps performed by a security system in accordance with an embodiment of the present invention.

FIG. 3 shows a more detailed flowchart illustrating the steps performed by the security system 100 in accordance with an embodiment of the present invention. The security system 100 is powered on in step 305. A trusted boot loader stored in the TCHM 105 utilizes the cryptographic facilities of the TCHM 105 to validate the trusted operating system and begin the trusted operating system's boot loading sequence. The trusted operating system 110 is then launched in step 315. In one embodiment, the trusted operating system 110 is a secure version of Linux that has been "hardened" (i.e., some of its functionality has been intentionally removed for security purposes). The launching of the trusted operating system 110 may occur via a trusted kernel loading module. The trusted kernel loading module may not have the ability to perform certain operations, such as network communication, unauthorized I/O, etc., as to prevent the unwanted transfer of sensitive data off of the security system.

As described above, the security system then authenticates the user in step 320. If the user is not authenticated in step 320, the security system powers off in step 325. If the user is authenticated in step 320, the trusted operating system 110 launches the virtual operating system 130 in step 330. All user interaction (after the initial boot sequence) occurs within the virtual machine (VM) 142 running the virtual operating system 130. In one embodiment, multiple operating systems may be executed on a single security system.

As described above, the trusted operating system 110 enforces one or more security policies in the virtual operating system 130. Because the user can only operate within the VM 142, the trusted operating system (i.e., a trusted kernel) can verify that the VM 142 and virtual operating system 130 are authentic. Also, the trusted operating system 110 cannot be corrupted through the use of the virtual operating system 130.

The trusted operating system 110 enables access to some or all of the data on the encrypted disk drive 120 via the virtual disk 145 in step 335. The virtual disk 145 viewed by the virtual operating system 130 is like any other disk. The virtual operating system 130 may be unaware that the disk is ever encrypted. The encryption of and access to the disk 120 is controlled by the trusted operating system 110. The trusted operating system 110 ensures the confidentiality, consistency, and authenticity of the data of the virtual disk image 145. In one embodiment, the trusted operating system 110 inspects the data stored on the disk drive 145 in step 340 as an additional security measure. At some later point, the user logs out (voluntarily or after a predetermined amount of time) in step 345 and the system 100 is powered off in step 325.

In another embodiment, and again referring to FIG. 1, the trusted operating system 110 enforces one or more security policies that define an information rate of the at least one output device 102. The information rate of the at least one output device 102 is the amount and/or quality of data that can be transmitted to an output device 102 (e.g., a monitor, over a network, etc.). Limiting the information rate can prevent a user from displaying (or printing) a high resolution image that would contain an encoding of all of the sensitive information. For example, the information rate of the security system's monitor can be set so that information is displayed at a particular rate such that the amount of information displayed by the monitor is much less than the amount of data that the system is protecting. Similarly, if the output device 102 is a printer, the information rate may be adjusted such that printing large amounts of data will be exceptionally time consuming and burdensome and therefore impractical. The information rate is adjusted such that a high resolution printout of all of the protected data cannot be printed (e.g., on a single sheet of paper).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus comprising:
   at least one hardware component;
   a trusted operating system to securely execute boot instructions for said at least one hardware component; and
   a virtual operating system in communication with said trusted operating system and having at least one security policy limiting the use of said at least one hardware component by at least one user.

2. The apparatus of claim 1, wherein said at least one hardware component further comprises at least one of an input module, an output module, a storage module, a networking module, an authentication device, a smart card reader, and a biometric authentication component.

3. The apparatus of claim 1, wherein said at least one hardware component is disabled from use in said virtual operating system.

4. The apparatus of claim 1, wherein said at least one hardware component is only partly accessible by the user in said virtual operating system.

5. The apparatus of claim 1, wherein at least one hardware component is an output module having an information flow rate that is limited in said virtual operating system to prevent the output of all sensitive information.

6. The apparatus of claim 1, wherein said trusted operating system halts execution when untrusted software is detected.

7. The apparatus of claim 1, wherein said trusted operating system allows user access for a predetermined amount of time.

8. A method of operation of at least one hardware component comprising:
  securely executing, by a trusted operating system, boot instructions for said at least one hardware component; and
  enforcing at least one security policy limiting the use of said at least one hardware component via a virtual operating system in communication with said trusted operating system.

9. The method of claim 8 wherein said securely executing boot instructions further comprises bootstrapping said trusted operating system.

10. An apparatus comprising:
  at least one hardware component;
  an operating system to execute boot instructions for said at least one hardware component;
  at least one of an input and an output device having an information rate; and
  a virtual operating system in communication with said operating system and having at least one security policy limiting the information rate of said at least one of an input and an output device.

11. The apparatus of claim 10 wherein said operating system is a trusted operating system to securely execute said boot instructions for said at least one hardware component.

12. The apparatus of claim 10 wherein said at least one output device at least one of a monitor, a printer, an audio device, and a networking module.

13. The apparatus of claim 10 wherein said at least one security policy is changeable via a remote server.

14. A method of operation of at least one hardware component comprising:
  executing, by an operating system, boot instructions for said at least one hardware component;
  enabling at least one output device to output information at an information rate; and
  enforcing at least one security policy to limit the information rate of said at least one output device via a virtual operating system in communication with said operating system.

15. The method of claim 14 wherein said executing of said boot instructions further comprises securely executing said boot instructions.

16. The method of claim 14 wherein said enabling at least one output device to output information further comprises displaying said information.

17. The method of claim 14 wherein said enabling at least one output device to output information further comprises printing said information.

18. The method of claim 14 wherein said enabling at least one output device to output information further comprises outputting said information to an audio device.

19. The method of claim 14 further comprising changing said at least one security policy via a remote server.

* * * * *